US009442923B1

(12) United States Patent
Abou Mahmoud et al.

(10) Patent No.: US 9,442,923 B1
(45) Date of Patent: Sep. 13, 2016

(54) SPACE CONSTRAINED TEXT TRANSLATOR

(71) Applicant: International Business Machines Corporation, Armonk, NY (US)

(72) Inventors: Alaa Abou Mahmoud, Dracut, MA (US); Paul R. Bastide, Boxford, MA (US); Robert E. Loredo, North Miami Beach, FL (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/950,232

(22) Filed: Nov. 24, 2015

(51) Int. Cl.
*G06F 17/28* (2006.01)
*G06F 17/27* (2006.01)

(52) U.S. Cl.
CPC .......... *G06F 17/289* (2013.01); *G06F 17/274* (2013.01); *G06F 17/275* (2013.01); *G06F 17/2795* (2013.01); *G06F 17/2809* (2013.01); *G06F 17/2854* (2013.01)

(58) Field of Classification Search
CPC . G06F 17/28; G06F 17/2809; G06F 17/2854
USPC ....................................................... 704/2–3
See application file for complete search history.

(56) References Cited

U.S. PATENT DOCUMENTS

| | | | |
|---|---|---|---|
| 5,251,130 A * | 10/1993 | Andrews ............... | G06F 17/289 704/3 |
| 6,453,462 B1 * | 9/2002 | Meade .................. | G06F 9/4448 704/10 |
| 6,950,986 B1 * | 9/2005 | Jacobi, Jr. ............... | G06T 11/60 283/117 |
| 7,275,049 B2 * | 9/2007 | Clausner ........... | G06F 17/30722 706/55 |
| 8,244,520 B2 * | 8/2012 | Ashworth ........... | G06F 17/2854 382/181 |
| 8,527,259 B1 | 9/2013 | Broniek et al. | |
| 9,104,661 B1 * | 8/2015 | Evans ..................... | G06F 17/28 |
| 2002/0143523 A1 * | 10/2002 | Balaji ................. | G06F 17/2205 704/8 |
| 2005/0235317 A1 * | 10/2005 | Green .................. | G11B 27/034 725/46 |
| 2006/0106593 A1 * | 5/2006 | Schultz ................. | G06F 17/212 704/5 |
| 2009/0113445 A1 * | 4/2009 | Sakashita ............ | G06F 17/2827 719/313 |
| 2009/0296124 A1 * | 12/2009 | Ohguro ................. | G06F 17/241 358/1.9 |

(Continued)

OTHER PUBLICATIONS

Spalink, Karin. "Small-Screen Devices and Translation." Proceedings of the International Conference on Translating and the Computer, Nov. 2002, pp. 1-8.*

*Primary Examiner* — James Wozniak
(74) *Attorney, Agent, or Firm* — Terry J. Carroll; SVL IPLaw Edell, Shapiro & Finnan, LLC

(57) ABSTRACT

According to one embodiment of the present invention, a system for converting a display from a source spoken language to a target spoken language includes at least one processor. The at least one processor may be configured to determine the source spoken language of content within a selected area of the display. The at least one processor may be further configured to translate the content from the source spoken language to a selected target spoken language. In addition, the at least one processor may be configured to evaluate the translated content and remap the translated content to the selected area based on the evaluation. Finally, the at least one processor may be configured to present the translated content within the selected area on the display.

20 Claims, 9 Drawing Sheets

(56) References Cited

U.S. PATENT DOCUMENTS

| | | | |
|---|---|---|---|
| 2010/0332214 A1* | 12/2010 | Shpalter | G06F 17/2854 704/2 |
| 2011/0097693 A1* | 4/2011 | Crawford | G09B 5/065 434/157 |
| 2011/0144972 A1* | 6/2011 | Koenig | G06F 9/4448 704/2 |
| 2013/0144603 A1* | 6/2013 | Lord | H04L 12/1831 704/9 |
| 2014/0006004 A1* | 1/2014 | Gundepuneni | G06F 17/2264 704/2 |
| 2014/0120503 A1* | 5/2014 | Nicol | G09B 5/02 434/157 |
| 2014/0125558 A1* | 5/2014 | Miyajima | G06F 17/289 345/8 |
| 2014/0222413 A1* | 8/2014 | Rossmann | G06F 17/289 704/3 |
| 2015/0124001 A1* | 5/2015 | Zheng | G06F 3/0481 345/676 |
| 2016/0004697 A1* | 1/2016 | van Putten | G06F 17/3053 707/706 |

* cited by examiner

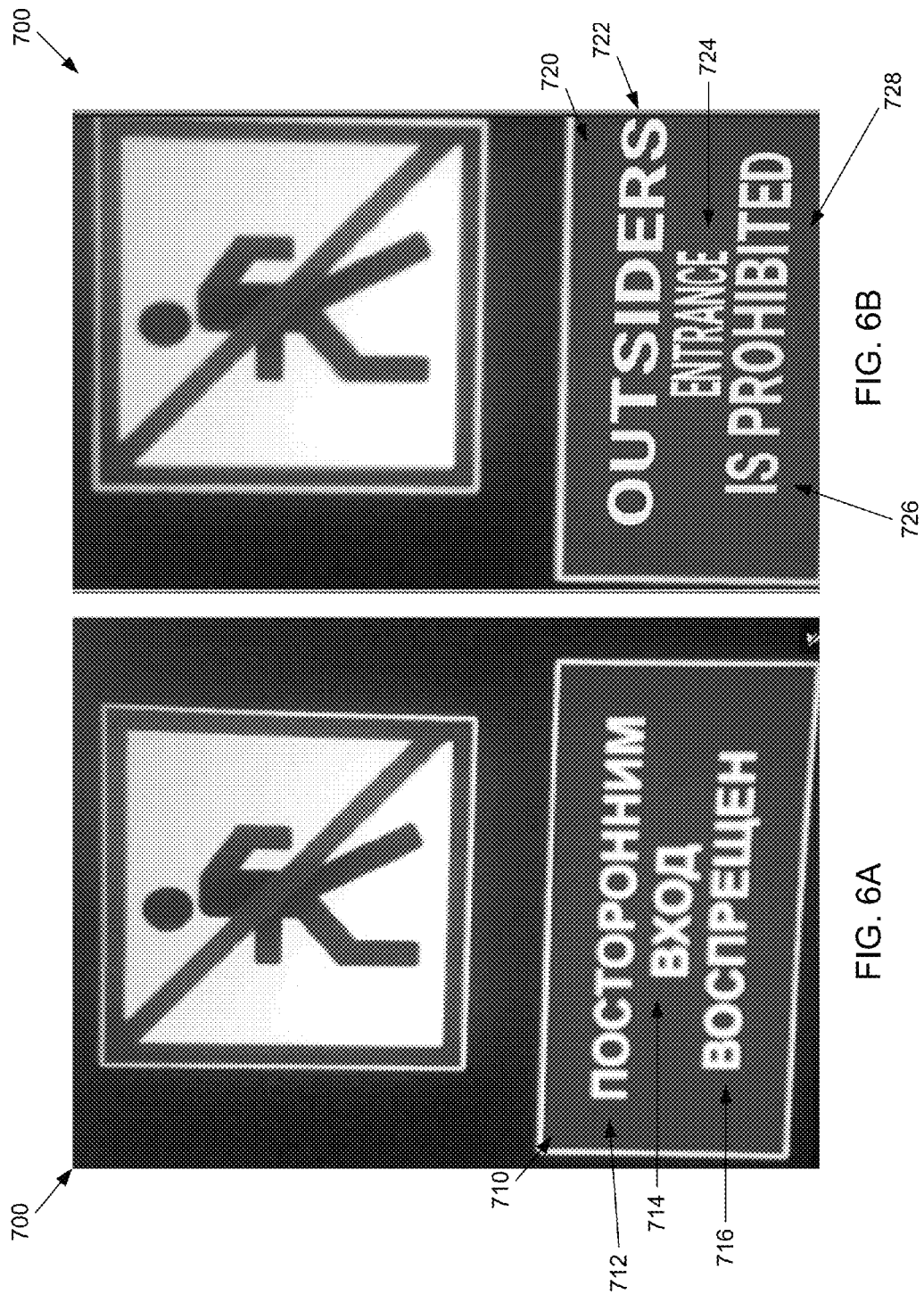

SPACE CONSTRAINED TEXT TRANSLATOR

BACKGROUND

1. Technical Field

Present invention embodiments relate to translating content on a display and, more specifically, to translating space constrained content on a display while maintaining the integrity, look, and feel of the content.

2. Discussion of the Related Art

Current text translators provide translations of source text from one spoken language to a target language without accounting for the space constraints of the source text. In some situations, text translators are used by users to merely find a translation of source text, where the user enters the source text into the translator and the translator provides a word for word translation to a target or destination language. However, with the world becoming increasingly connected and with the many different languages spoken throughout the world, text translators are being used in many different situations.

While there does exist text translators that will translate text of content by simply overlaying the translated text over the original content, these translators fail to properly account for space constraints of the original or source text when translating. These translators simply overlay the most basic translations over the source text without accounting for the space constrains of the source text, the presentation of the content, and the utility of the content. Thus, more often than not, the translated text provided by these translators run into adjacent text sections, are overlaid on top of other translated text, or may extend off of the content entirely. Because translations often contain a different number of characters than that of the original source text, the space constraints of the original source text must be accounted for.

SUMMARY

According to one embodiment of the present invention, a system for converting a display from a source spoken language to a target spoken language includes at least one processor. The at least one processor may be configured to determine the source spoken language of content within a selected area of the display. The at least one processor may be further configured to translate the content from the source spoken language to a selected target spoken language. In addition, the at least one processor may be configured to evaluate the translated content and remap the translated content to the selected area based on the evaluation. Finally, the at least one processor may be configured to present the translated content within the selected area on the display.

Furthermore, when evaluating the translated content, the at least one processor may be configured to determine that the translated content extends beyond the selected area and remap the translated content to fit within the selected area. Additionally, remapping the translated content by the at least one processor may include reverting one or more terms in the translated content to the source spoken language, truncating one or more from a group of adjectives and adverbs within the translated content, creating conjunctions from a plurality of terms within the translated content, replacing one or more terms in the translated content with synonyms, modifying a grammar of one or more clauses within the translated content, altering a font of the translated content, and converting the translated content to a version with a less accurate translation. The at least one processor may be further configured to remap the translated content based on at least one policy that includes one or more rules. In addition, the selected area may be associated with a predetermined amount of content for the remapping of the translated content, and the at least one processor may be configured to remap the translated content based on a predetermined amount of space for the selected area. Finally, when translating the content, the at least one processor may selectively translate one or more portions of the content based on an importance to enable the translated content to fit within the selected area of the display.

BRIEF DESCRIPTION OF THE DRAWINGS

Generally, like reference numerals in the various figures are utilized to designate like components.

FIG. 6A is another example of an image being displayed on a mobile device.

FIG. 6B is an example of the text of the image displayed on the mobile device of FIG. 6A being translated into another spoken language.

Like reference numerals have been used to identify like elements throughout this disclosure.

DETAILED DESCRIPTION

The present invention embodiments pertain to a system and method for translating space constrained text from a source spoken language to a target or destination spoken language. The system may allow the user to, or may automatically, determine a selected area on a display screen. The system may then detect any source text that is disposed within the selected area of the display screen. The system may further determine if the detected source text is written in a spoken language. The system may then prompt a user for a desired translated language, where the system then translates the detected source text from the detected spoken language to the target or destination spoken language. Moreover, the system may evaluate the destination text to determine if the destination text fits within the space constraints of the source text. When the system determines that the destination text does not fit within the space constraints of the source text, the system remaps the destination text to fit within the space constraints of the source text while still conveying the same message as the source text.

Current text translators fail to properly account for space constraints when translating text from one language to another. Translations, more often than not, contain a different number of characters than the original source text. Thus, translations, when maintaining the same formatting styling, often do not fit within the spaces occupied by the source text. This creates a discrepancy between the look, feel, and presentation of the source text and content with that of the translated text and content. With translated words extending beyond the space constraints of the source text, the utility of the content containing the text may be lost. In addition, when different sections of source text are disposed adjacent to one another, and these text sections are translated into another language, the result may be overlaying text sections of translated text because the translations were longer than the source text. The present invention embodiments may be used to display translated text within the space constraints of the source text. By accounting for the space constraints of the source text, the present invention provides translated content (websites, images, documents, etc.) that contains the same look, feel, and utility as the original content. Thus, the present invention retains the utility and integrity of the original content while providing the translated content. The present invention is also useful for providing translated content on mobile devices, where the display space is limited, and every pixel of displayed content is carefully calculated and arranged to provide the user with a designed experience.

Figure 1:
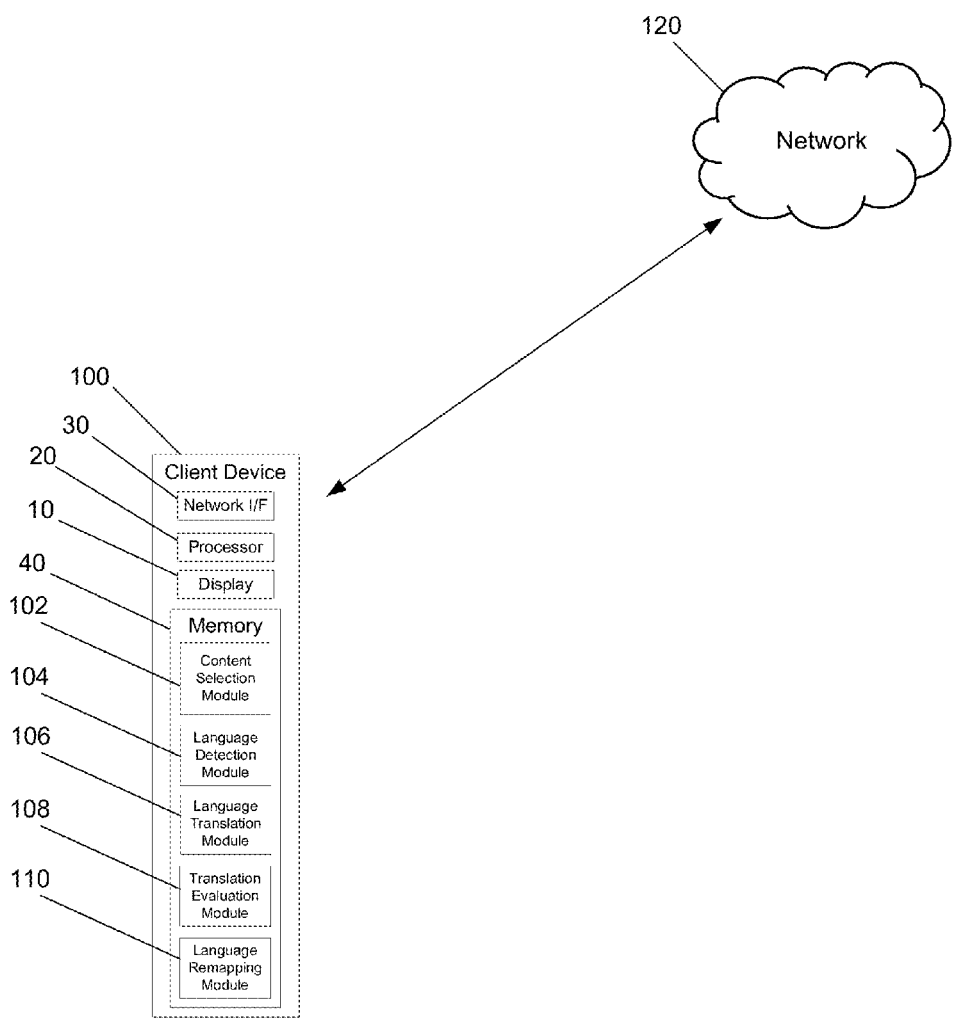
FIG. 1 is a diagrammatic illustration of an example of a computing environment for use with an embodiment of the present invention.

An example environment for use with present invention embodiments is illustrated in FIG. 1. The environment includes one or more client or end-user systems 100 that is configured to communicate with a network 120. The network 120 may be implemented by any number of any suitable communications media (e.g., wide area network (WAN), local area network (LAN), Internet, Intranet, etc.). The client system 100 may further operate without being in communication with the network 120. In other words, the client system 100 may operate offline.

Client systems 100 may be implemented by any conventional or other computer systems preferably equipped with a display or monitor 10, a base (e.g., including at least one processor 20, one or more memories 40 and/or internal or external network interfaces or communications devices 30 (e.g., modem, network cards, etc.)), optional input devices (e.g., a keyboard, mouse or other input device), and any commercially available and custom software (e.g., server/communications software, content selection module, language detection module, language translation module, translation evaluation module, language remapping module, browser/interface software, etc.).

Client systems 100 enable users to establish communication links via communication channels (e.g., email, SMS/text messaging, tweeting, instant messaging, audio calls, video chats, web browsing, etc.) with other client systems 100 and/or the server systems. The client systems 100 may include a series of modules 102, 104, 106, 108, 110 that ultimately enables the user of the client system 100 to translate text displayed on the display 10 of the client system 100 while maintaining a look and feel of the display that is consistent with the original display. Modules 102, 104, 106, 108, 110 may include one or more modules or units to perform the various functions of present invention embodiments described below. The various modules (e.g., content selection module, language detection module, language translation module, translation evaluation module, language remapping module, etc.) may be implemented by any combination of any quantity of software and/or hardware modules or units, and may reside within memory 40 of the client system 100 for execution by processor 20.

In the environment illustrated in FIG. 1, the content selection module 102 of the client system 100 enables the user of the client system 100 to select an area of the display 10 of the client system 100 based on a bounding box having (x1, y1) and (x2, y2) coordinates of opposing corners of the bounding box. The language detection module 104 of the client system 100 detects whether or not text is present within the selected area of the display 10 from the content selection module 102. The language detection module 104, upon the detection of text within the selected area, may also detect the spoken language of the text. For example, the language detection module 104 may determine if the text within the selected area is written in English, Spanish, French, German, Italian, etc. The language translation module 106 of the client system 100 translates the text detected within the selected area from a detected spoken language to a desired spoken language. The client system 100 further includes a translation evaluation module 108 and a language remapping module 110. The translation evaluation module 108 evaluates whether the translation of the text detected within the selected area fits within the selected area while maintaining the same look, feel, and characteristics of the originally detected text. The language remapping module 110 of the client system 100 is operated by the client system 100 when the translation evaluation module 108 determines that the translated text will not fit within the selected area while maintaining the same look, feel, and characteristics of the originally detected text. Upon the translation evaluation module 108 determining that the translated text will not fit within the selected area, the language remapping module 110 modifies the translation so that the translation still conveys the same message of the originally detected text, but is able to fit within the selected area while having the same look, feel, and characteristics of the originally detected text. In order to modify the translation, the language remapping module 110 may use procedures, such as, but not limited to, truncating adjectives and adverbs, creating conjunctions, selecting synonyms, converting the grammar, changing the font characteristics, changing to a lossy translation, etc. The language remapping module 110 may utilize any of these steps or procedures, alone or in combination, to successfully remap the translation to fit within the selected area.

Figure 2:
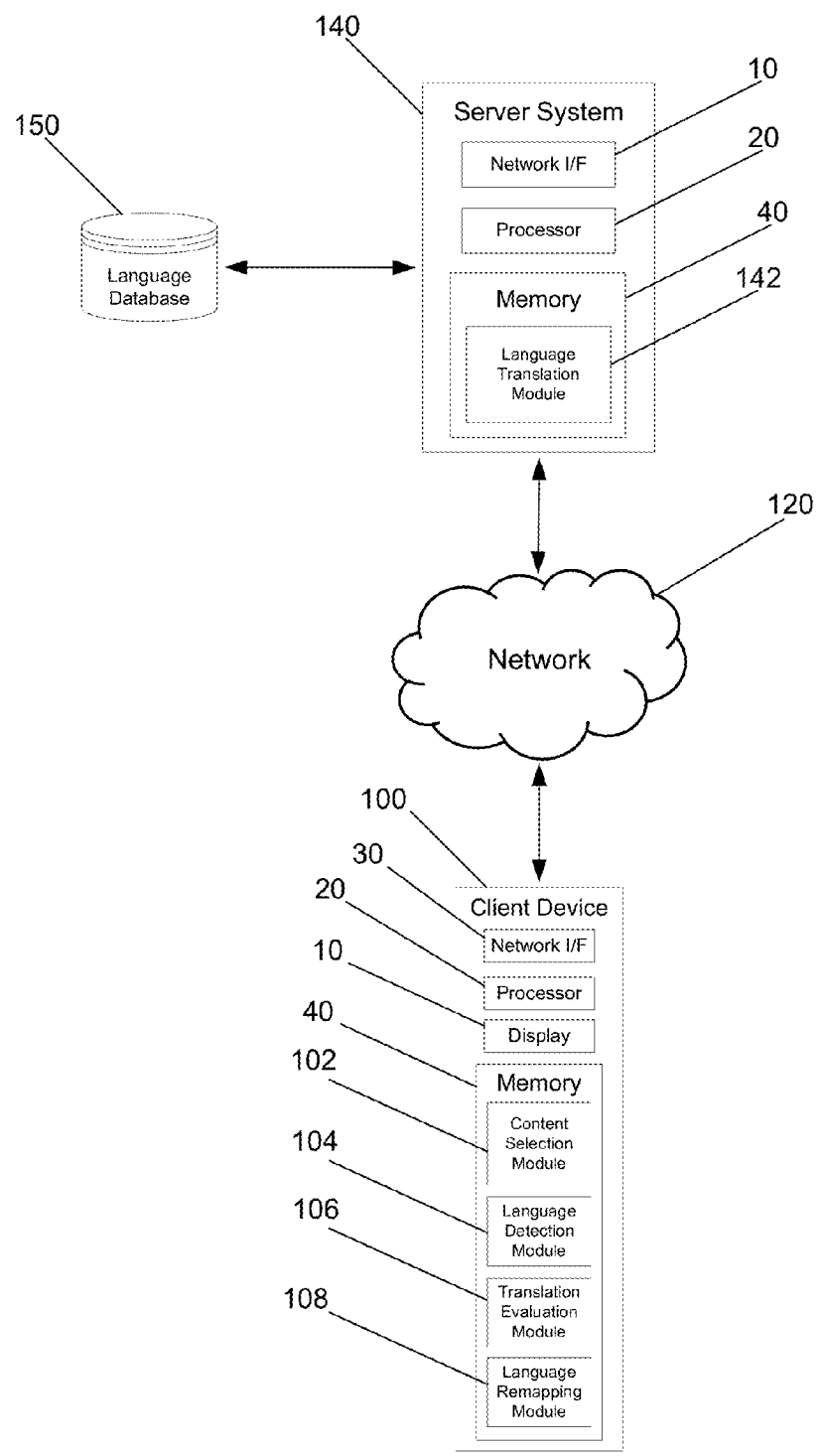
FIG. 2 is a diagrammatic illustration of a second example of a computing environment for use with an embodiment of the present invention.

A second example environment for use with present invention embodiments is illustrated in FIG. 2. Specifically, the environment includes at least one client or end-user systems 100 and at least one server system 140. The server systems 140 and client system 100 may be remote from each other and communicate over the network 120. Similar to the first example illustrated in FIG. 1, the network 120 may be implemented by any number of any suitable communications media (e.g., wide area network (WAN), local area network (LAN), Internet, Intranet, etc.). Alternatively, client system 100 and server system 140 may be local to each other, and communicate via any appropriate local communication medium (e.g., local area network (LAN), hardwire, wireless link, Intranet, etc.).

Server systems 140 and client system 100 may be implemented by any conventional or other computer systems preferably equipped with a display or monitor 10, a base (e.g., including at least one processor 20, one or more memories 40 and/or internal or external network interfaces or communications devices 30 (e.g., modem, network cards, etc.)), optional input devices (e.g., a keyboard, mouse or other input device), and any commercially available and custom software (e.g., server/communications software, content selection module, language detection module, language translation module, translation evaluation module, language remapping module, browser/interface software, etc.).

As explained previously, the client system 100 may contain a content selection module 102 that enables the user of the client system 100 to select an area of the display 10 of the client system 100 based on a bounding box having (x1, y1) and (x2, y2) coordinates. Furthermore, the client system 100 may include a language detection module 104 that detects both text located within the selected area, or bounding box, and the spoken language in which the detected text is written. Unlike the example illustrated in FIG. 1, the server system 140 may contain a language translation module 142. The server system 140 may receive the detected text from the client system 100 along with the desired language in which to translate the detect text. The language detection module 142 of the server system 140 may access a language database 150 of the server system 140 in order to provide an accurate translation of the detected text. Once the server system 140 has translated the detected text received from the client system 100, the server system 140 sends the translation of the detected text to the client system 100. Once the client system 100 receives the translation of the detected text, the client system 100 utilizes the translation evaluation module 108. Similar to the first example illustrated in FIG. 1, the translation evaluation module 108 of the client system 100 evaluates the translation of the detected text to determine how well the translation fits within the selected area. However, the translation evaluation module 108 illustrated in FIG. 2 is evaluating the translation completed by the server system 140, not the client system 100 like that of the example illustrated in FIG. 1. As similarly explained with regard to the example illustrated in FIG. 1, in the event that the translation of the detected text does not fit properly within the selected area, the language remapping module 110 of the client system 100 may modify the translation so that the translation still conveys the same message of the originally detected text, but is able to fit within the selected area while having the same look, feel, and characteristics of the originally detected text. The language remapping module 110 may modify a translation by using procedures, such as, but not limited to, truncating adjectives and adverbs, creating conjunctions, selecting synonyms, converting the grammar, changing the font characteristics, changing to a lossy translation, etc. Alternatively, the language remapping module 110 may be located on the server system 140, rather than the client system 100.

Figure 3:
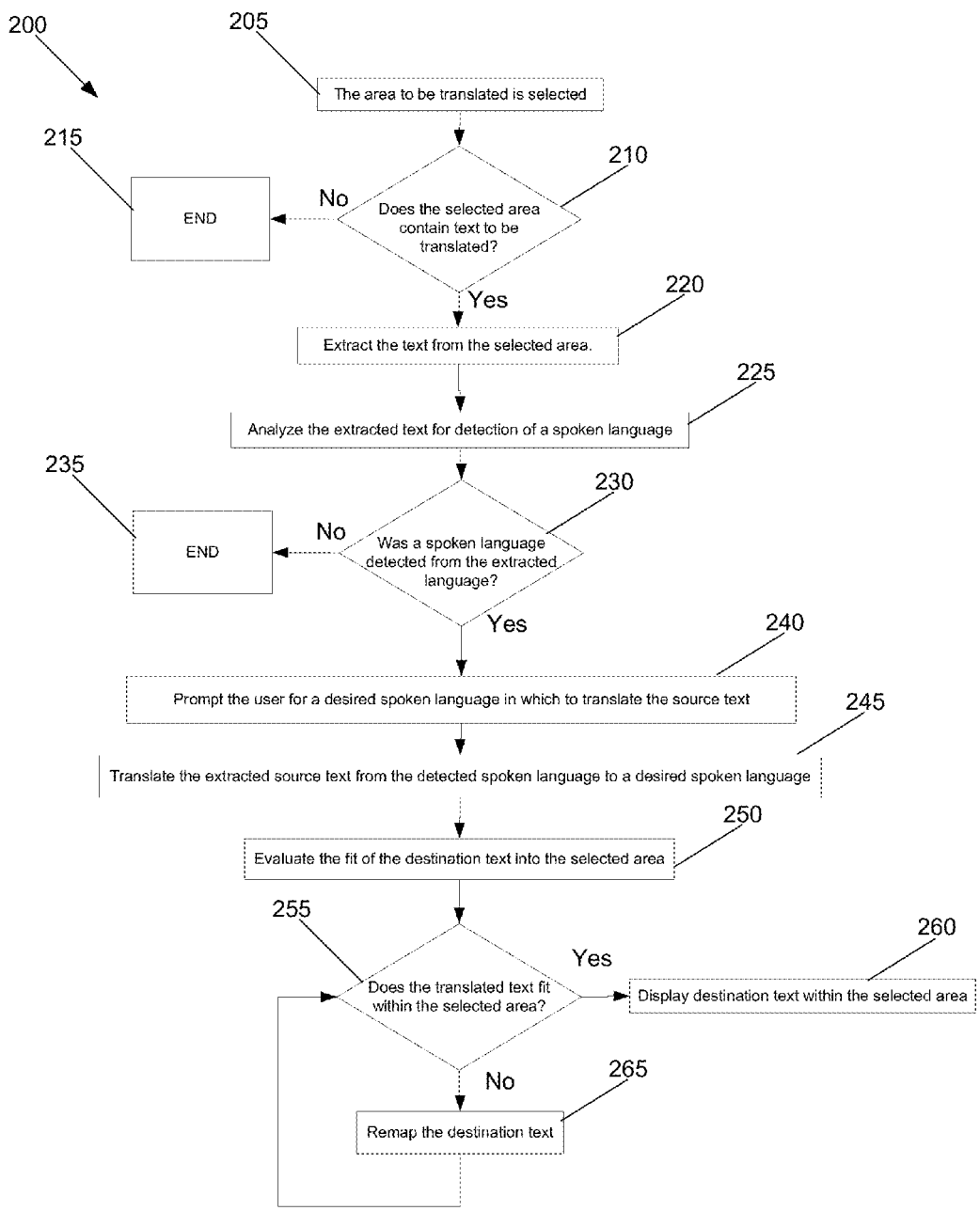
FIG. 3 is a procedural flow chart illustrating an example manner for translating text within a selected area according to an embodiment of the present invention.

Turning to FIG. 3, illustrated is a flow chart 200 of the steps performed for translating text displayed on a client system 100 to another spoken language while retaining the same or similar look and feel of the source text and the integrity of the presentation of the text. The flow chart 200 illustrated in FIG. 3 may be performed by the multiple devices (e.g., client system 100 and server system 140) illustrated in FIGS. 1 and 2 to operate the modules 102, 104, 106, 108, 110, and 142 to detect source text, translate the source text to a desired destination text, evaluate the destination text within the space constraints of the source text, and remap the destination text to fit within the space constraints of the source text. At block 205, the user selects the area that the user wishes to have text translated. The user may select the area on the display 10 of the client system 100 with a bounding box. The bounding box may be defined as a box having a lower leftmost corner defined with first coordinates X1, Y1 and an upper rightmost corner defined with second coordinates X2, Y2. The first and second coordinates represent coordinates of a coordinate system that may be overlayed onto the display 10 of the client system 100. In some instances, the coordinate system may be based on the number of pixels of the display 10 of the client system 100. Moreover, as first coordinates or second coordinates change their location, the area defined by the bounding box changes. As the difference between the first coordinates and the second coordinates increases, the area defined by the bounding box increases. Furthermore, as the difference between the first coordinates and the second coordinates decreases, the area defined by the bounding box decreases. The bounding box may serve as part of the content selection module 102 of the client system 100. Thus, the bounding box defines the area selected by the user of the client system 100. In another embodiment, the bounding box may not require manual input by the user and may be automatically set on the display 10. In yet another embodiment, the bounding box may be automatically set to the entire display 10 so that the entire display serves as the selected area.

Once the bounding box of the content selection module 102 has been set, at block 210, the language detection module 104 may analyzes the selected area to determine if the selected area contains text. The language detection module 104 uses optical character recognition (OCR) to detect any type of text (typed text, handwritten text, printed text, etc.) that is located within the selected area. If the language detection module 104 does not detect any text within the selected area, then at block 215, the client system 100 stops the translation of the selected area. However, if, at block 210, the language detection module 104 detects text within the selected area, then, at block 220, the language detection module 104 uses the OCR technology to convert or extract the detected text, or source text, to a machine-encoded text. The language detection module 104 may easily identify text when there is a clear difference between the border of the characters of the text and the background on which the text is placed. In converting or extracting the source text, the language detection module 104 may further determine the styling properties and constraints of the source text. The styling properties and constraints may refer to the characteristics of each section of the source text, such as, but not limited to, the font, the font size, the font styling (bold, italics, underline, strikethrough, etc.), the font spacing, the line spacing, the space constraints of the location of the text section, whether or not the font contains an embedded hyperlink, etc. The language detection module 104 may calculate the space constraints of each of the text sections by calculating the total word(s) size and/or the character(s) size of the detected source text. The language detection module 104 may further calculate the space constraints of each of the text sections based on the document in which the content is located. For example, in a word document with columns, the space constraints may be based on the width and height of the columns.

At block 225, the language detection module 104 may then determine, from the converted or extracted text, if the source text within the selected area is written in a spoken language (e.g., English, French, Spanish, Italian, Russian, etc.). The language detection module 104 may utilize or leverage detection tools, such as, but not limited to, Google Translate, to detect or determine the spoken language of the source text. If, at block 230, the language detection module 104 did not detect a spoken language from the source text disposed within the selected area (i.e., formulas, numbers, random letters, etc.), then the client system 100, at block 235, stops the translation of the selected area. However, if, at block 230, the language detection module 104 did detect a spoken language from the source text disposed within the selected area, then, at block 240, the user is prompted for a desired spoken language to which to translate the source text.

At block 245, the language translation module 106 of the client system or the language translation module 142 of the server system 140 may translate the detected source text within the selected area to the desired destination text. As previously explained, the language translation module 106 may be disposed on the client system 100, and the language translation module 142 may be disposed on the server system 140. Regardless of where the language translation module 106, 142 is located, the language translation module 106, 142 is configured to take the source text detected by language detection module 104 and translate the source text from the detected spoken language to the desired destination language indicated by the user of the client system 100. The language translation module 106 may perform a machine translation, such as that of a statistical machine translation. In addition to translating the source text in the selected area, the language translation module 106 may calculate the size of the word(s) and the size of the character(s) for each text section that is being translated. The language translation module 106 may be operable to maintain the same styling of the source text for the translated or destination text. In other words, the language translation module 106 translates the source text while maintaining the same styling of the source text, such as, but not limited to, the font, the font size, the font styling (bold, italics, underline, strikethrough, etc.), the font spacing, the line spacing, etc. In addition, to enable the translated content fit within the selected area of the display, the language translation module 106 may be further operable to selectively translate one or more sections of the source text.

At block 250, the translation evaluation module 108 evaluates the destination text and determines if, with the same or substantially similar mapping properties, the destination text fits within the calculated space constraints of the source text. As previously explained, one of the styling properties or constraints that the language detection module 104 determines is the space constraints of each of the text sections of the source text. If, at block 255, the translation evaluation module 108 determines that the destination text, while maintaining all of the other styling properties, does fit within the space constraints of the source text, then at block 260 the client system 100 displays the destination text within the selected area.

However, if, at block 255, the translation evaluation module 108 determines that the destination text, while maintaining all of the other styling properties of the source text, does not fit within the space constraints of the source text, then, at block 265, the destination text is remapped by the language remapping module 110. The language remapping module 110 may use a plurality of techniques for remapping the destination text to fit within the space constraints of the source text. Some of the techniques of the language remapping module 110 include, but are not limited to, reverting terms in the content to the source language, truncating adjectives and adverbs, creating conjunctions, selecting synonyms, converting the grammar, changing the font characteristics, changing the translation to a lossy translation, etc. Once the destination text has been remapped at block 265, the translation evaluation module 108, at block 255, evaluates the remapped destination text to determine if the remapped destination text should be displayed at block 260 or if the remapped destination text 265 requires further remapping by the language remapping module 110.

The language remapping module 110 may have policies in place that dictate or prioritize the constraints and techniques that are applied based on a user, a company, an application, etc. For example, a user's company may set a policy that the language remapping module 110 never changes the grammar of a translation, and only changes the font size. In addition, certain applications may have policies that can be set, or built in, that dictate which techniques may be performed by the language remapping module 110. User's themselves may also set policies that determine which techniques can be used and which techniques cannot be used by the language remapping module 110.

Figure 4A:
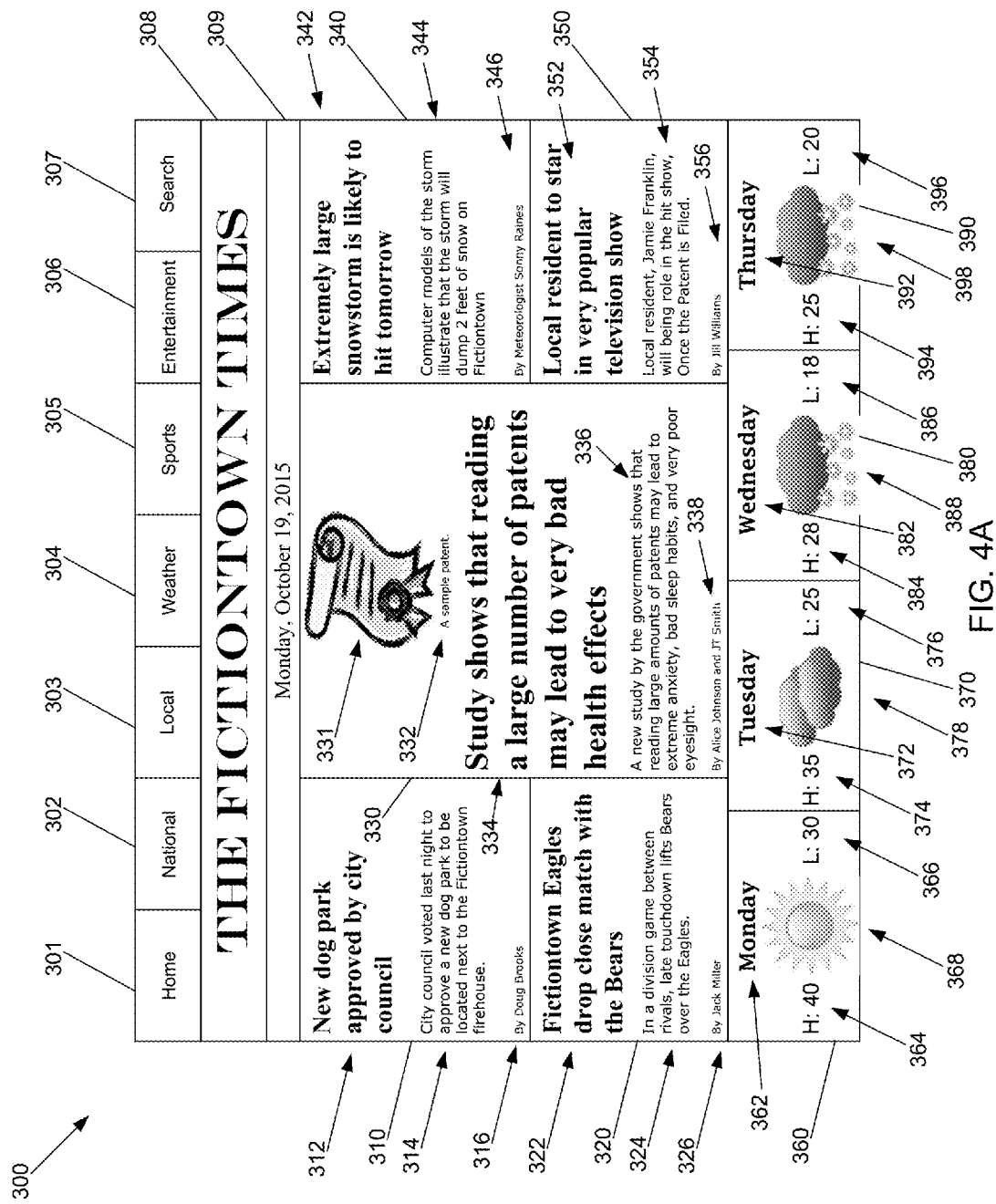
FIG. 4A is an illustration of an example website displayed with a plurality of text in English.
Figure 4B:
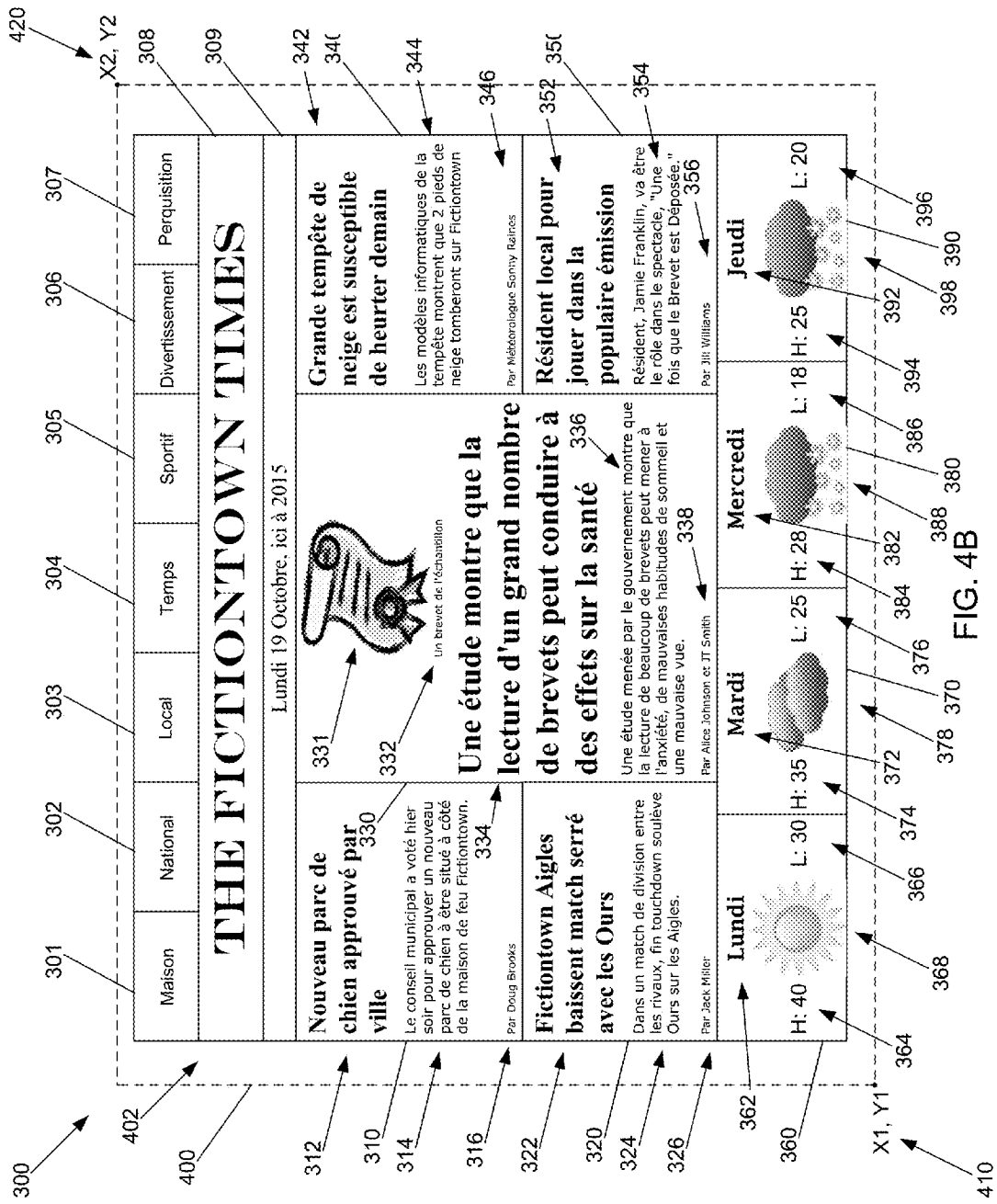
FIG. 4B is illustration of the example website of FIG. 4A, where a selected area contains text that has been translated to a language other than English.

Turning to FIGS. 4A-4B illustrated is an example of website 300 for a newspaper that is viewed through a web browser on a client system 100. The website 300 is displayed in English. The view illustrated in FIGS. 4A-4B for the website 300 may serve as the home page for the website 300. As illustrated in FIG. 4A, the website 300 includes a series of banner panels 301-307 and two title panels 308, 309. The title panels 308, 309 are located below the banner panels 301-307. The banner panels 301-307 may each contain a hyperlink, which went selected, or clicked, load a related website pertaining to the illustrated website 300. Thus, clicking on panel 305 may bring up the Fictiontown Times sports section of the website 300. The website further includes a series of content panels 310, 320, 330, 340, 350, 360, 370, 380, 390. The content panels 310, 320, 330, 340, 350, 360, 370, 380, 390 are disposed beneath the title panels 308, 309. Content panels 310, 320, 330, 340, 350 contain various text sections. Thus, first content panel 310 includes a title text section 312, a summary text section 314, and an author text section 316. The second content panel 320 may also includes a title text section 322, a summary text section 324, and an author text section 326. The third content panel 330, which is the largest and most central of the content panels 310, 320, 330, 340, 350 and may contain an image 331. The third content panel 330 may contain an image description text section 332, a title text section 334, a summary text section 336, and an author section 338. Similar to the first and second content panels 310, 320, the fourth content panel 340 includes a title text section 342, a summary text section 344, and an author text section 346, and the fifth content panel 350 includes a title text section 352, a summary text section 354, and an author text section 356. Each title text section 312, 322, 334, 342, 352 may include a hyperlink, which went selected, or clicked, load a related website that contains the story associated with the title text section. Moreover, the image 331 may also contain a hyperlink that went selected, or clicked, loads the related website that contains the story associated with the title text section 334.

As further illustrated in FIGS. 4A-4C, the content panels 360, 370, 380, 390 are located below the content panels 310, 320, 330, 340, 350. The content panels 360, 370, 380, 390 may each be a weather content panel that indicates the day 362, 372, 382, 392 in which the content panel 360, 370, 380, 390 represents. Moreover, each of the weather content panels 360, 370, 380, 390 may include the high temperature 364, 374, 384, 394 and a lower temperature 366, 376, 386, 396. Finally, each of the weather content panels 360, 370, 380, 390 further includes an icon 368, 378, 388, 398 that signifies the weather for that specific day.

Figure 4C:
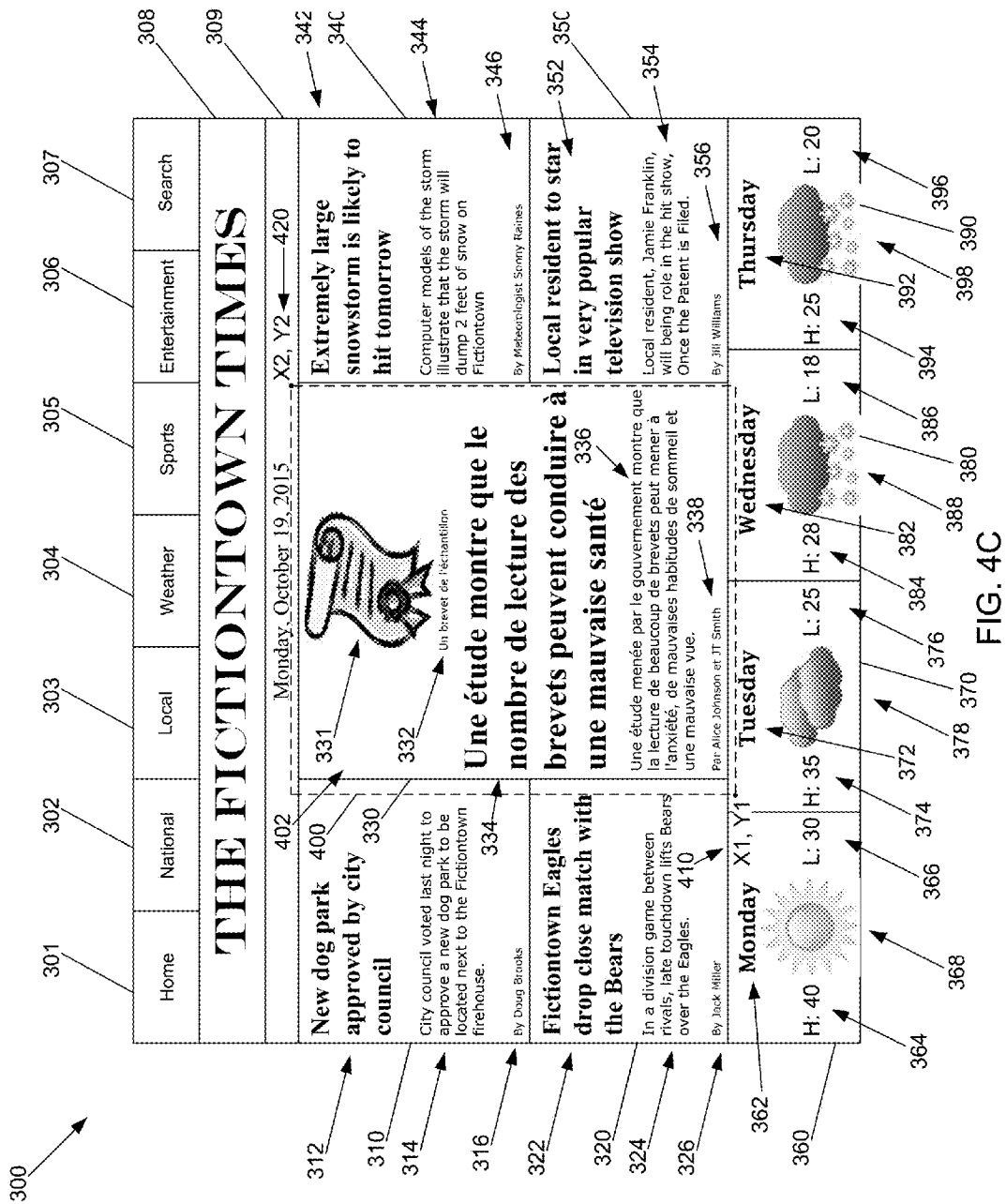
FIG. 4C is an example of the website of FIG. 4A, where a second selected area contains text that has been translated to a language other than English.

FIGS. 4B and 4C illustrate the website 300 with a bounding box 400 and converted text disposed within the bounding box 400. FIGS. 4B and 4C illustrate the website 300 of FIG. 4A after being translated to another language, e.g., French. As previously stated, the bounding box 400 is defined as a box having a lower leftmost corner defined with first coordinates 410 and an upper rightmost corner defined with second coordinates 420. Furthermore, the bounding box 400 may serve as part of the content selection module 102 and defines the area 402 selected by the user of the client system 100. The size of the bounding box 400 differs between FIGS. 4B and 4C. As illustrated in FIG. 4B, the bounding box 400 encompasses the entire website 300. Thus, the entire website 300 has been selected by the user of the client system 100. Conversely, as illustrated in FIG. 4C, the bounding box 400 only encompasses the central content panel 330. Thus, in FIG. 4C, the user may have only selected that specific story displayed in central content panel 330 on the website 300. The difference between FIGS. 4B and 4C demonstrate that the user of the client system 100 may set or select the area of the display 10 of the client system 100 to be translated. When a user of the client system 100 wishes to translate something from the original spoken language to a second spoken language, the user of the client system 100 utilizes the bounding box 400 of the content selection module 102 to define the selected area 402.

As previously explained, once the bounding box 400 of the content selection module 102 has been set, the language detection module 104 analyzes the selected area, or area defined by the bounding box 400, for text that is located within the selected area 402. As illustrated in FIGS. 4A-4C, the website 300 contains black texted disposed on a white background, and thus, the language detection module 104 may easily identify the text of the website 300. The language detection module 104 may further detect that the source text within the selected area 402 of was English. The language detection module 104 may then, after detecting the spoken language of the source text disposed within the selected area 402, prompt the user of the client system 100 to selected a translated language or destination language. Thus, the language detection module 104 asks the user of the client system 100 to select a language to which the source text disposed within the selected area 402 will be translated. As illustrated in FIGS. 4B and 4C, the user of the client system 100 may have chosen to have the source text translated to French.

As previously explained, the language detection module 104 may further be configured to determine the styling properties and constraints of the source text. When the source text, as illustrated in FIGS. 4A-4C, contains multiple sections of text, the language detection module 104 may determine the styling properties and constraints for each of the text sections of the source text. In the example illustrated in FIG. 4B, the source text encompasses all of the text of the website 300 disposed within the bounding box 400. Thus, as illustrated in FIG. 4B, the source text is comprised of many different text sections of the website 300, where each text section has different styling properties and constraints. For example, the text of one of the banner panels 301-307 may have different mapping properties and constraints from that of the text within the content panels 310, 320, 330, 340, 350, 360, 370, 380, 390. Moreover, as illustrated in FIGS. 4B and 4C, the different text sections (image description text section, title text section, summary text section, and an author section) within the content panels 310, 320, 330, 340, 350, 360, 370, 380, 390 may also each contain different mapping properties and constraints. As further illustrated in FIGS. 4A-4C, each of the text sections fits within a panels 301-309, 310, 320, 330, 340, 350, 360, 370, 380, 390 that have predefined heights and widths. Thus, the space constraints for each text section may be determined by the language detection module 104 based on the panel that each text section is disposed within. Thus, the language detection module 104 may be configured to determine each text section and determine the specific styling properties and constraints for each section.

As previously explained, after the language detection module 104 detects source text having a spoken language within the selected area 402, and after the user of the client system 100 has chosen the spoken language to translate the source text to, the language translation module 106, 142 may then be used to translate the detected source text. As illustrated in FIGS. 4B and 4C, the text sections located within the bounding box 400 have been translated from the English text illustrated in FIG. 4A to French text.

After the text of the website 300 been translated, the translation evaluation module 108 evaluates the destination text and determines if, with the same or substantially similar styling properties, the destination text fits within the space constraints that were previously occupied by the source text. As previously explained, the language detection module 104 may determine the space constraints of each of the text sections of the source text of the website 300 based on the widths and heights of the various panels of the website 300. The translation evaluation module 108 then determines, after the source text has been translated to the destination text, whether or not the destination text fits within the space constraints defined by the widths and heights of the panels of the website 300.

Continuing with FIGS. 4B and 4C, several text sections the destination text were evaluated by the translation evaluation module 108 as needing to be remapped by the language remapping module 110. For example, as illustrated in FIG. 4B, the title text section 312 of the first content panel 310 originally read, in English, "New dog park approved by city council". However, as illustrated in FIG. 4B, when the translated to another language, such as French, the title text section 312 of the first content panel 310 reads "Nouveau parc de chien approuvé par ville", which in English means "New dog park approved by the city." If the source text of the title text section 312 were translated word for word into French, the translation would read "Nouveau parc de chien approuvé par le conseil municipal", which would not fit within the space constraints of the source text. Thus, the destination text was remapped by the language remapping module 110 to a lossy translation from that of the source text. In other words, the destination text was remapped to by the language remapping module 110 to a different translation that still conveys the same message.

FIG. 4B further illustrates several examples of the language remapping module 110 remapping the destination text by truncating adjectives and adverbs. As illustrated in FIG. 4A, the source text of the title text section 342 of the fourth content panel 340 reads, in English, "Extremely large snowstorm is likely to hit tomorrow". However, as illustrated in FIG. 4B, when the translated to another language, such as French, the title text section 342 of the fourth content panel 340 reads "Grande tempête de neige est susceptible de heurter demain", which in English means "Large snowstorm is likely to hit tomorrow." If the source text of the title text section 342 were translated word for word into French, the translation would read "Très grande tempête de neige est susceptible de heurter demain", which would not fit within the space constraints of the source text. Thus, the destination text was remapped by the language remapping module 110 to drop the translation of the adjective "extreme" from the destination text while still conveying the same message to the reader.

Another example of the language remapping module 110 using the technique of truncating adjectives and adverbs is illustrated in FIGS. 4B and 4C for the title text section 334 and the summary text section 336 of the third content panel 330. As illustrated in FIG. 4A, the source text of the title text section 334 of the third content panel 330 reads, in English, "Study shows that reading a large number of patents may lead to very bad health effects". However, as illustrated in FIGS. 4B and 4C, when the translated to another language, such as French, the title text section 334 of the third content panel 330 reads "Une étude montre que la lecture d'un grand nombre de brevets peut conduire à des effets sur la santé", which in English means "Study shows that reading a large number of patents may lead to health effects". Thus, the language remapping module 110 dropped the translation of the adverb "very" and the adjective "bad" from the destination text. The source text of the title text section 334 were translated word for word into French, the translation would read "Une étude montre que la lecture de grands nombres de brevets peut conduire à de trés mauvais effets sur la santé", which would not fit within the space constraints of the source text.

Regarding the summary text section 336 of the third content panel 330, as illustrated in FIG. 4A, the source text of the summary text section 336 reads, in English, "A new study by the government shows that reading large amounts of patents may lead to extreme anxiety, bad sleep habits, and very poor eyesight". However, as illustrated in FIGS. 4B and 4C, when the translated to another language, such as French, the summary text section 336 of the third content panel 330 reads "Une étude menée par le gouvernement montre que la lecture de beaucoup de brevets peut mener à l'anxiété, de mauvaises habitudes de sommeil et une mauvaise vue", which in English means "A study conducted by the government shows that reading many patents can lead to anxiety, poor sleep habits and poor eyesight". The source text of the summary text section 336 translated word for word into French would read "Une nouvelle étude menee par le gouvernement montre que la lecture de grandes quantités de brevets peut mener à l'anxiété extrême, de mauvaises habitudes de sommeil, et une très mauvaise vue", which would not fit within the space constraints of the source text. Thus, the language remapping module 110 dropped the translation of the adjectives "new" and "extreme" from the destination text. Furthermore, the language remapping module 110 used the translation of the English word "many" for "large amounts" and used the translation of the English word "bad" for "very poor" so that the destination text will fit within the area occupied by the source text.

In addition, title text section 352 and the summary text section 354 of the fifth text section 350 illustrated in FIG. 4B have destination text that required language remapping by the language remapping module 110, where adjectives or adverbs were either truncated or removed from the destination text. For the title text section 352, the language remapping module 110 dropped the translation of the adverb "very" from the destination text. For the summary text section 354, the language remapping module 110 dropped the translation of the adjectives "local" and "hit."

FIG. 4B further illustrates an example of the language remapping module 110 remapping the destination text by converting the grammar of the source text. As illustrated in FIG. 4A, the source text of the summary text section 344 of the fourth content panel 340 reads, in English, "Computer models of the storm illustrate that the storm will dump 2 feet of snow on Fictiontown". However, as illustrated in FIG. 4B, when the translated to another language, such as French, the summary text section 344 of the fourth content panel 340 reads "Les modèles informatiques de la tempête illustrent 2 pieds de neige tomberont sur Fictiontown", which in English means "Computer models of the storm show that 2 feet of snow will fall on Fictiontown." If the source text of the title text section 342 were translated word for word into French, the translation would read "Les modèles informatiques de la tempête illustrent que la tempête va déverser 2 pieds de neige sur Fictiontown", which would not fit within the space constraints of the source text. Thus, the destination text was remapped by the language remapping module 110 to change the grammar of the source text while still conveying the same message.

As further illustrated in FIG. 4B, the title text section 322 and the summary text section 324 of the second text section 320 contain destination text that did not require language remapping by the language remapping module 110. Once these two text sections were translated by the language translation module 106, the translation evaluation module 108 determined that the word for word translation of the source text, written in English, to the destination text, written in French, fits within the area previously occupied the source text while still maintaining the same styling properties and constraints.

While FIGS. 4B and 4C illustrated a website 300, and specifically a news website, being translated from English to French, it is to be understood that the website 300 may be written in any spoken language and translated to any other spoken language. The content selection module 102, language detection module 104, language translation module 106, 142, translation evaluation module 108, and language remapping module 110 may be used to convert any spoken language to any other spoken language. Moreover, it is to be understood that the website 300 illustrated in FIGS. 4A, 4B, and 4C is presented for illustrative purposes only, and it should not be interpreted that the content selection module 102, language detection module 104, language translation module 106, 142, translation evaluation module 108, and language remapping module 110 can only be used on websites. The modules 102, 104, 106, 108, 110, 142 may be used to translate any text from any type of website, any type of document, any type of images that contain text, etc. Thus, the modules 102, 104, 106, 108, 110, 142 may be used to translate any text displayable on a display screen of the client system 100.

Figure 5A:
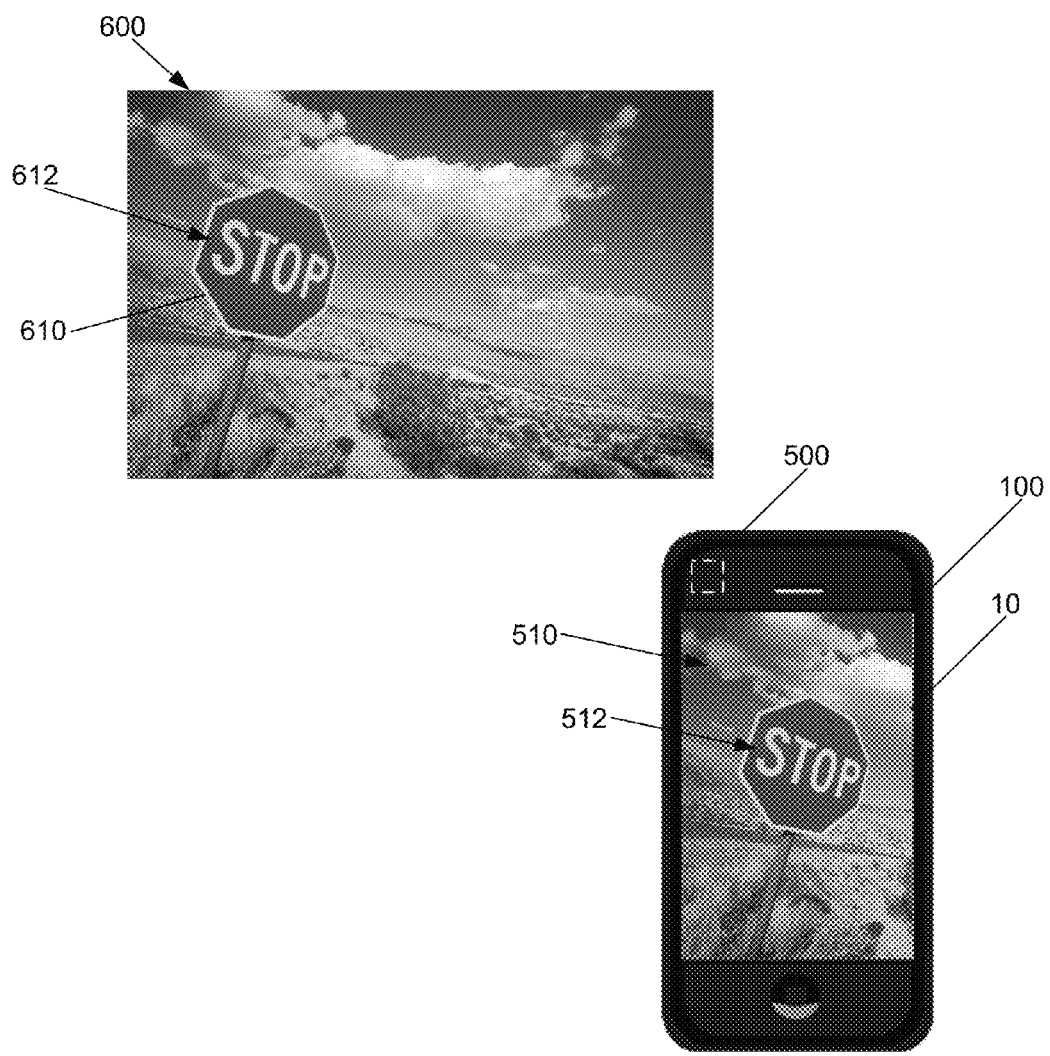
FIG. 5A is an example of an image being displayed on a mobile device.
Figure 5B:
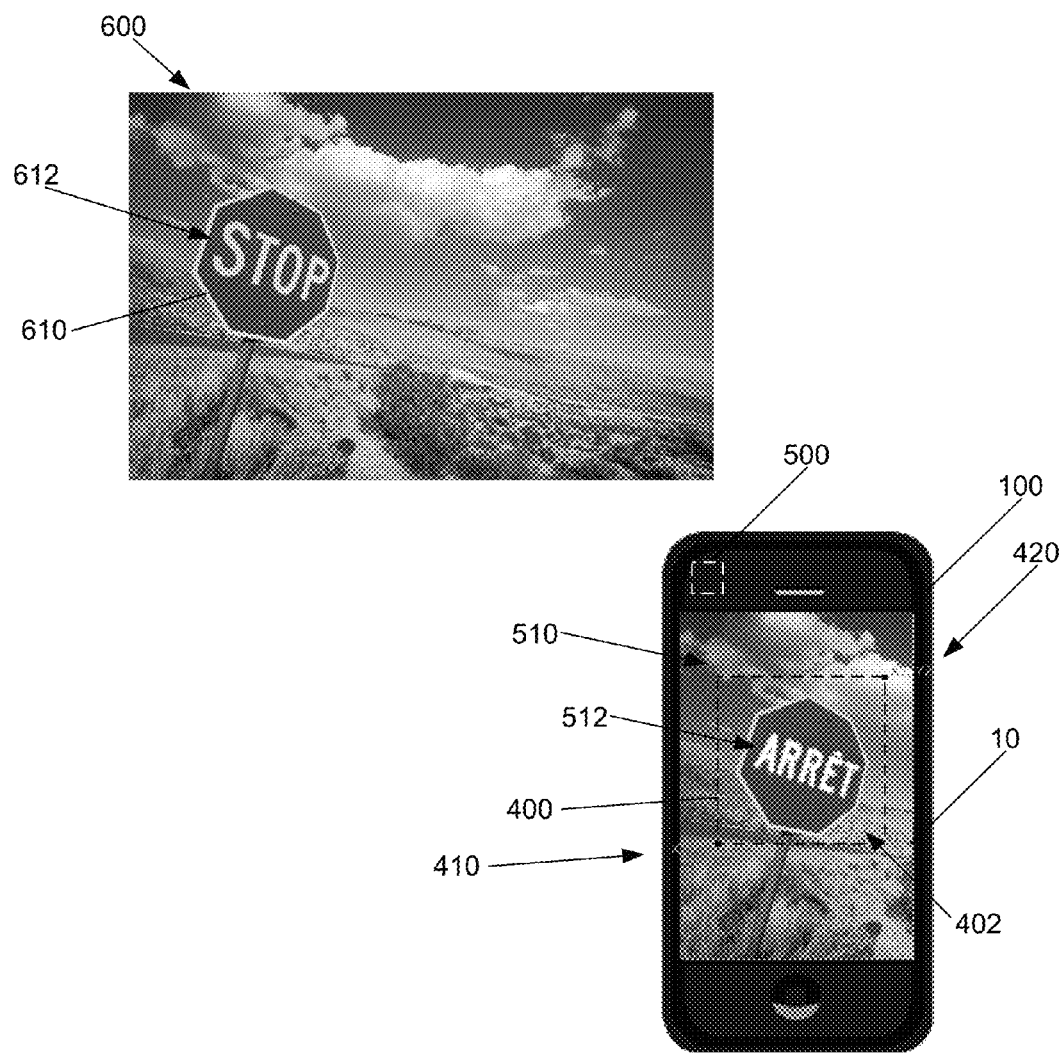
FIG. 5B is an example of the text of the image displayed on the mobile device of FIG. 5A being translated to another spoken language.

Turning to FIGS. 5A and 5B, illustrated is an example embodiment of the client system 100, where the client system 100 is a mobile device that is used to translate text disposed within an image. The client system 100 illustrated in FIGS. 5A and 5B includes a display screen 10 and a camera 500. As further illustrated, the client system 100 is being pointed or directed at scenery 600 that includes a sign 610 with text 612. Thus, the camera 500 of the client system 100 is directed at the scenery 600, and more specifically, at the sign 610. As illustrated in FIG. 5A, the sign 610 is displayed on the screen 10 of client system 100. The display 10 may be configured to display an image 510 taken by the camera 500. The display 10 may be further configured to display the live feed 510 from the camera 500, or, in other words, the view from the camera 500. As further illustrated in FIG. 5A, because the sign 610 includes the text of "STOP" 612, the display 10 of the image or live feed 510 includes a text section 512, which contains the text of the word "STOP."

In the event that the user of the client system 100 illustrated in FIGS. 5A and 5B wished to know the translation of the sign, the user may utilize the client system 100 to translate an image/live feed 510 of the sign 610 on the client device 100. As illustrated in FIG. 5B, once the user has positioned the client system 100 to display the sign 610 on the display 10 via the image/live feed 510, the user of the client system 100 may place a bounding box 400 around the text 512 displayed via the content selection module 102. As previously stated, the bounding box 400 is defined as a box having a lower leftmost corner defined with first coordinates 410 and an upper rightmost corner defined with second coordinates 420. The first and second coordinates 410, 420 are based on a coordinate system that may be overlayed onto the display 10 of the client system 100. The bounding box 400 defines the area 402 selected by the user of the client system 100. Thus, as illustrated in FIG. 5B, the user of the client system 100 positioned a bounding box around the text section 512 displayed on the display 10 of the client system 100. In another embodiment, the bounding box 400 may not require manual input and may be automatically set on the display 10. In yet another embodiment, the bounding box may be automatically set to the entire display 10.

The language detection module 102, as previously explained, may then detect the text section 512 of the image/live feed 510 displayed through the display 10 of the client system 100. The language detection module 104 uses the OCR technology to convert or extract the detected text, or source text, into machine-encoded text. Because the image/live feed 510 displays a stop sign having a text section 512 that contains white text characters disposed on a red background, the language detection module 102 may be able to easily detect the word "STOP". As previously explained, the language detection module 104 may further utilize or leverage detection tools to detect the spoken language of the text section 512. The language detection module 104 may then prompt the user of the client system 100 to select a translated language or destination language. As illustrated in FIGS. 5A and 5B, the detected spoken language of the text section 512 would be English, and, when prompted, the user of the client system 100 may have selected to translate the text section 512 into French. The language detection module 104 may further determine the styling properties and constraints of the text section 512.

The language translation module 106 may then be used to translate the detected text section 512 within the selected area 402 by the language detection module 104. The language translation module 108 is configured to take the text section 512 detected by language detection module 104 and translate the text section 512 from the detected spoken language to the destination language indicated by the user of the client system 100. Thus, as illustrated in FIG. 5B, the text section 512 has been translated from English to French. After the text has been translated, the translation evaluation module 108 evaluates the destination text and determines if, with the same or substantially similar styling properties, the destination text fits within the area previously occupied by the text section 512. As illustrated in FIG. 5B, the text section 512 has been translated from the English word "STOP" to the French word "ARRÊT". Because of the space constraints from the source text of the text section 512, and because the French word "arrêt" contains more text characters than the English word "stop", the translation evaluation module 108 detected that the destination text would expand outside of the original area occupied by the text section 512. In other words, the destination text of "arrêt", when sized and shaped exactly like that of the text section 512 of FIG. 5A, would expand off of the sign 610. Thus, the language remapping module 110 may have altered the font, the font size, and/or the font spacing of the destination text to fit within the original area occupied by the text section 512.

The example illustrated in FIGS. 5A and 5B is an example of the client system 100 being a mobile device. In the example illustrated in FIGS. 5A and 5B, it may not be required for the client system 100 be connected to the network 120 to perform the translation of the text on the screen. Unlike the example illustrated in FIGS. 4A-4C, where the client system 100 is viewing a website 300 on the internet, the client system 100 illustrated in FIGS. 5A and 5B is merely using the camera 500 to acquire the text that is to be translated. By having the modules 102, 104, 106, 108, 110 run natively on the client system 100 without requiring a connection to a network 120, the client system 100 may be used in situations where a network connection is not possible. For example, when traveling abroad, a user of a mobile device may not access to data on their mobile device, but may use their mobile device as depicted in FIGS. 5A and 5B to translate road signs, menus, books, etc.

Turning to FIGS. 6A and 6B, illustrated another example of the client system 100 used to translate source text disposed within an image that is displayed on the display of the client system 100. FIG. 6A illustrates the original image 700 with a text section 710 having source text written in Russian. The source text section 710 contains a first word 712, a second word 714, and a third word 716, where the second word 714 is disposed on the line above the third word 716, and the first word 712 is disposed on the line above the second word 714. Moreover, as illustrated in FIG. 6A, the first and third words 712, 716 are longer and contain more characters than the second word 714. FIG. 6B illustrates the image 700 with translated text section 720 that reads "Outsiders entrance is prohibited." The translated text section 720 contains a first word 722 ("outsiders"), a second word 724 ("entrance"), a third word 726 ("is"), and a fourth word 728 ("prohibited"). As illustrated in FIG. 6B, the third and fourth words 726, 728 are disposed along the same line next to one another, while the second word 724 is disposed on the line above the third and fourth words 726, 728. Moreover, the first word 722 is disposed on the line above the second word 724. As illustrated, the translation of the source text contains more words and characters than that of the source text. However, through the translation evaluation module 108 and the remapping module 110, the font size and spacing of the translated text section 720 is altered and manipulated such that the translated text section 720 mimics the look and feel of that of the source text section 710. Thus, the font size and spacing of the first word 722 of the translated text section 720 is altered so that the first word 722 of the translated text section 720 contains approximately the same length along the first line of the translated text section 720 as the first word 712 on the first line of the source text section 710. The font size and spacing of the second word 724 of the translated text section 720 is altered so that the second word 724 of the translated text section 720 contains approximately the same length along the second line of the translated text section 720 as the second word 714 on the second line of the source text section 710. Finally, the font size and spacing of the third and fourth words 726, 728 of the translated text section 720 are altered so that the third and fourth words 726, 728 of the translated text section 720 comprise approximately the same length along the third line of the translated text section 720 as the third word 716 on the third line of the source text section 710.

It will be appreciated that the embodiments described above and illustrated in the drawings represent only a few of the many ways of implementing embodiments for translating source text from a source spoken language to a target spoken language while maintaining the same characteristics and presentation of the source text.

The embodiments described above and illustrated in the drawings improve the user's experience when translating content from a source spoken language to a target spoken language. The embodiments described above may optimize translations for space constrained source text. The embodiments described above may further provide mobile translation enhancements, such that a user's mobile device can be used to translate text from signs or from a book, enhancing a user's enjoyment of traveling abroad.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, content selection modules, language detection modules, language translation modules, translation evaluation modules, and language remapping modules, etc.). These systems may include any types of monitors and input devices (e.g., keyboard, mouse, voice recognition, etc.) to enter and/or view information.

It is to be understood that the software (e.g., content selection modules, language detection modules, language translation modules, translation evaluation modules, and language remapping modules, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., content selection modules, language detection modules, language translation modules, translation evaluation modules, and language remapping modules, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., spoken language profiles, text characters and letters, font styles, font sizes, grammar rules, etc.). The database system may be implemented by any number of any conventional or other databases, data stores or storage structures (e.g., files, databases, data structures, data or other repositories, etc.) to store information (e.g., spoken language profiles, text characters and letters, font styles, font sizes, grammar rules, etc.). The database system may be included within or coupled to the server and/or client systems. The database systems and/or storage structures may be remote from or local to the computer or other processing systems, and may store any desired data (e.g., spoken language profiles, text characters and letters, font styles, font sizes, grammar rules, etc.).

The present invention embodiments may employ any number of any type of user interface (e.g., Graphical User Interface (GUI), command-line, prompt, etc.) for obtaining or providing information (e.g., spoken language profiles, text characters and letters, font styles, font sizes, grammar rules, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for determining an option for any activity between the participants by analyzing the preferences, limitations, and capabilities of each of the participants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of converting a display from a source spoken language to a target spoken language comprising:
    determining the source spoken language of content within a selected area of the display;
    machine translating the content from the source spoken language to a selected target spoken language;
    evaluating the machine translated content;
    remapping the machine translated content to the selected area based on the evaluation by reverting one or more terms in the machine translated content to the source spoken language, truncating one or more from a group of adjectives and adverbs within the machine translated content, creating conjunctions from a plurality of terms within the machine translated content, replacing one or more terms in the machine translated content with synonyms, modifying a grammar of one or more clauses within the machine translated content, and converting the machine translated content to a version with a less accurate translation; and
    presenting the machine translated content within the selected area on the display.

2. The method of claim 1, wherein evaluating the machine translated content comprises:
    determining that the machine translated content extends beyond the selected area and remapping the machine translated content to fit within the selected area.

3. The method of claim 1, wherein remapping the translated content further includes
    altering a font of the machine translated content.

4. The method of claim 1, wherein the remapping the machine translated content comprises:
    remapping the machine translated content based on at least one policy each including one or more rules.

5. The method of claim 1, wherein the selected area is associated with a predetermined amount of content for the remapping of the machine translated content.

6. The method of claim 1, wherein the remapping of the machine translated content further comprises:
    remapping the machine translated content based on a predetermined amount of space for the selected area.

7. The method of claim 1, wherein the translating the content comprises:
    selectively translating one or more portions of the content based on an importance to enable the machine translated content to fit within the selected area of the display.

8. A system for converting a display from a source spoken language to a target spoken language comprising:
    at least one processor configured to:
        determine the source spoken language of content within a selected area of the display;
        machine translate the content from the source spoken language to a selected target spoken language;
        evaluate the machine translated content;
        remap the machine translated content to the selected area based on the evaluation by reverting one or more terms in the machine translated content to the source spoken language, truncating one or more from a group of adjectives and adverbs within the machine translated content, creating conjunctions from a plurality of terms within the machine translated content, replacing one or more terms in the machine translated content with synonyms, modifying a grammar of one or more clauses within the machine translated content, and converting the machine translated content to a version with a less accurate translation; and
        present the machine translated content within the selected area on the display.

9. The system of claim 8, wherein evaluating the machine translated content further comprises:
    determining that the machine translated content extends beyond the selected area and remapping the machine translated content to fit within the selected area.

10. The system of claim 8, wherein remapping the machine translated content further includes
    altering a font of the machine translated content.

11. The system of claim 8, wherein the remapping the machine translated content comprises:
    remapping the machine translated content based on at least one policy each including one or more rules.

12. The system of claim 8, wherein the selected area is associated with a predetermined amount of content for the remapping of the machine translated content.

13. The system of claim 8, wherein the remapping of the machine translated content further comprises:
    remapping the machine translated content based on a predetermined amount of space for the selected area.

14. The system of claim 8, wherein the translating the content comprises:
    selectively translating one or more portions of the content based on an importance to enable the machine translated content to fit within the selected area of the display.

15. A computer program product for converting a display from a source spoken language to a target spoken language comprising:
    a computer readable storage medium having program instructions embodied therewith, the program instructions executable by a processor to cause the processor to:
        determine the source spoken language of content within a selected area of the display;
        machine translate the content from the source spoken language to a selected target spoken language;
        evaluate the machine translated content;

remap the machine translated content to the selected area based on the evaluation by reverting one or more terms in the machine translated content to the source spoken language, truncating one or more from a group of adjectives and adverbs within the machine translated content, creating conjunctions from a plurality of terms within the machine translated content, replacing one or more terms in the machine translated content with synonyms, modifying a grammar of one or more clauses within the machine translated content, and converting the machine translated content to a version with a less accurate translation; and present the machine translated content within the selected area on the display.

16. The computer program product of claim 15, wherein evaluating the machine translated content further comprises:

determining that the machine translated content extends beyond the selected area and remapping the machine translated content to fit within the selected area.

17. The computer program product of claim 15, wherein remapping the machine translated content further includes altering a font of the machine translated content.

18. The computer program product of claim 15, wherein the remapping the machine translated content comprises:

remapping the machine translated content based on at least one policy each including one or more rules.

19. The computer program product of claim 15, wherein the selected area is associated with a predetermined amount of content for the remapping of the machine translated content.

20. The computer program product of claim 15, wherein the remapping of the machine translated content further comprises:

remapping the machine translated content based on a predetermined amount of space for the selected area.

* * * * *